UNITED STATES Patent [19]

Graham et al.

[11] 3,886,387
[45] May 27, 1975

[54] FLUX SHIELD FOR DYNAMOELECTRIC MACHINES

[75] Inventors: Peter H. Graham, Schenectady; Paul Reece, Scotia, both of N.Y.

[73] Assignee: General Electric Company, Schenectady, N.Y.

[22] Filed: Dec. 26, 1973

[21] Appl. No.: 427,627

Related U.S. Application Data

[63] Continuation-in-part of Ser. No. 384,310, July 31, 1973.

[52] U.S. Cl. ............................... 310/256; 310/196
[51] Int. Cl. ............................................... H02k 1/12
[58] Field of Search ............ 310/182, 183, 93, 190, 310/254, 256, 196, 72, 68 R, 68 C

[56] References Cited
UNITED STATES PATENTS

| 1,677,004 | 7/1928 | Pohl | 310/256 |
| 2,061,502 | 11/1936 | Calvert | 310/196 |
| 3,354,331 | 11/1967 | Broeker et al. | 310/196 |
| 3,670,192 | 6/1972 | Andersson et al. | 310/196 |
| 3,714,477 | 1/1973 | Gott | 310/256 |
| 3,714,483 | 1/1973 | Nurnberg et al. | 310/256 |

*Primary Examiner*—Mark O. Budd
*Attorney, Agent, or Firm*—John F. Ahern; James W. Mitchell

[57] ABSTRACT

An arrangement is provided for preventing leakage flux from intersecting the end flanges and the stator core of dynamoelectric machines. An annular flux shield is attached to, but electrically insulated from, each end flange. The shield intersects the flux path and minimizes induced currents in the end flanges and the stator core. A resistance path is provided between each flux shield and its corresponding end flange to maintain the shield at substantially ground potential.

5 Claims, 4 Drawing Figures

3,886,387

3,886,387

FLUX SHIELD FOR DYNAMOELECTRIC MACHINES

This application is a continuation-in-part of our co-pending application Ser. No. 384,310, filed July 31, 1973, and assigned to the present assignee.

BACKGROUND OF THE INVENTION

1. Field of the Invention

The subject matter of this invention relates to dynamo-electric machines having stator and rotor cores of magnetic material and more particularly to flux shields therefor.

Large dynamoelectric machinery operates at high flux densities. Under such conditions, the main flux in the generator is opposed by the reaction flux of the armature, and this results in low core flux levels. Nonetheless, a large leakage flux component exists at the ends of the stator and rotor and this leakage flux can intersect the end flanges and portions of the stator core. Such flux tends to travel in the end flanges and stator cores and currents induced by this flux can lead to heating. Such effects may be augmented when the generator is fully loaded in service.

2. Description of the Prior Art

In the prior art, copper shields, such as are taught in French Pat. No. 431,047 and in U.S. Pat. No. 3,714,483 have been employed to prevent the stray flux between the rotor and the stator from intersecting the end flanges and producing such overheating. These prior art shields, however, have normally been in electrical connection with the end flanges. Thus, currents induced in the shields are transferred into the end flanges structure and core heating still may occur.

By the present invention, each flux shield is electrically insulated from its corresponding end flange so that the currents induced in the flux shields are not transferred directly to the end flange as in the prior art structures but are constrained to remain wholly within the flux shield. A single resistance path is provided between each flux shield and the end flange to maintain the flux shield at substantially ground potential.

Accordingly, one object of this invention is an improved arrangement for preventing leakage or stray flux from intersecting the end flanges and stator core, thereby preventing currents induced by this flux from overheating the stator core.

It is another object of this invention to provide an improved flux shield which prevents the current induced in such a shield by leakage or stray flux from passing to the end flange.

It is another object of this invention to electrically insulate the flux shield from the end flange and also to maintain the flux shield at the desired potential.

SUMMARY OF THE INVENTION

These and other objects of the invention are achieved, in one form thereof, by the improved flux shield and the mounting arrangement therefor. The shield is mounted in such a way as to be electrically insulated from the end flange and the remainder of the dynamoelectric machine structure. A single resistance connection is provided between each flux shield and its corresponding end flange to maintain the flux shield at substantially ground potential.

BRIEF DESCRIPTION OF THE DRAWINGS

The invention, together with further advantages and objects thereof, may be better understood by referring to the following specification including the drawings in which.

DESCRIPTION OF THE PREFERRED EMBODIMENTS

Figure 1:
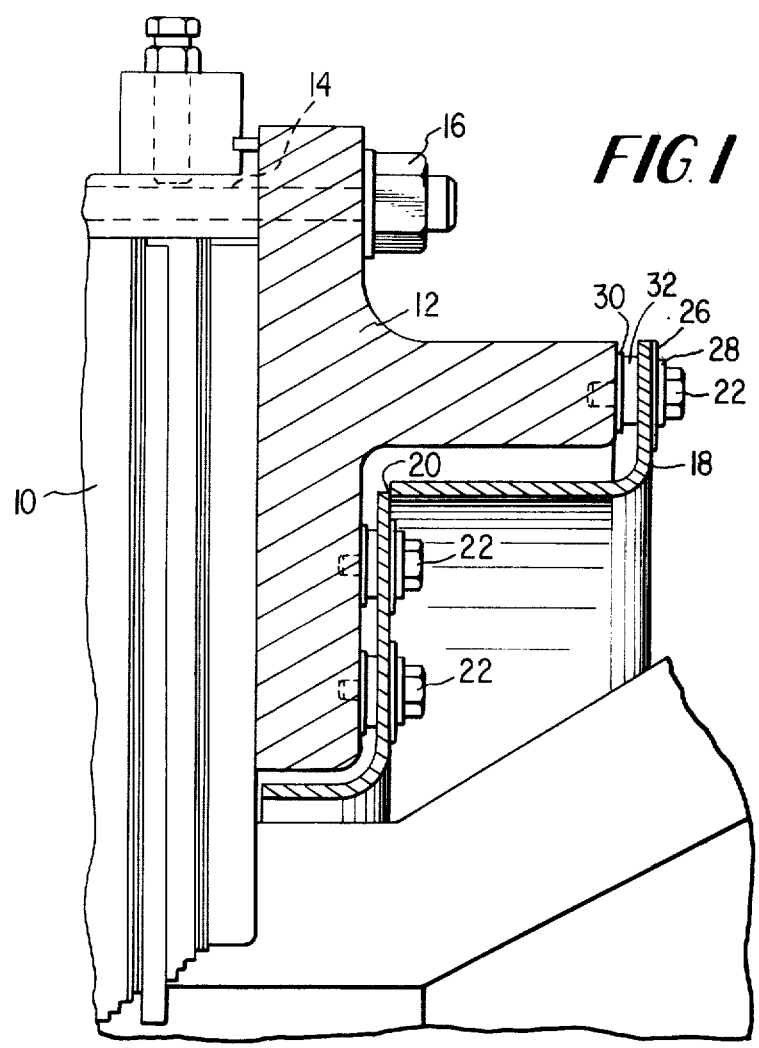
FIG. 1 is a sectional view of a portion of a dynamo-electric machine incorporating one embodiment of the present invention.
Figure 2:
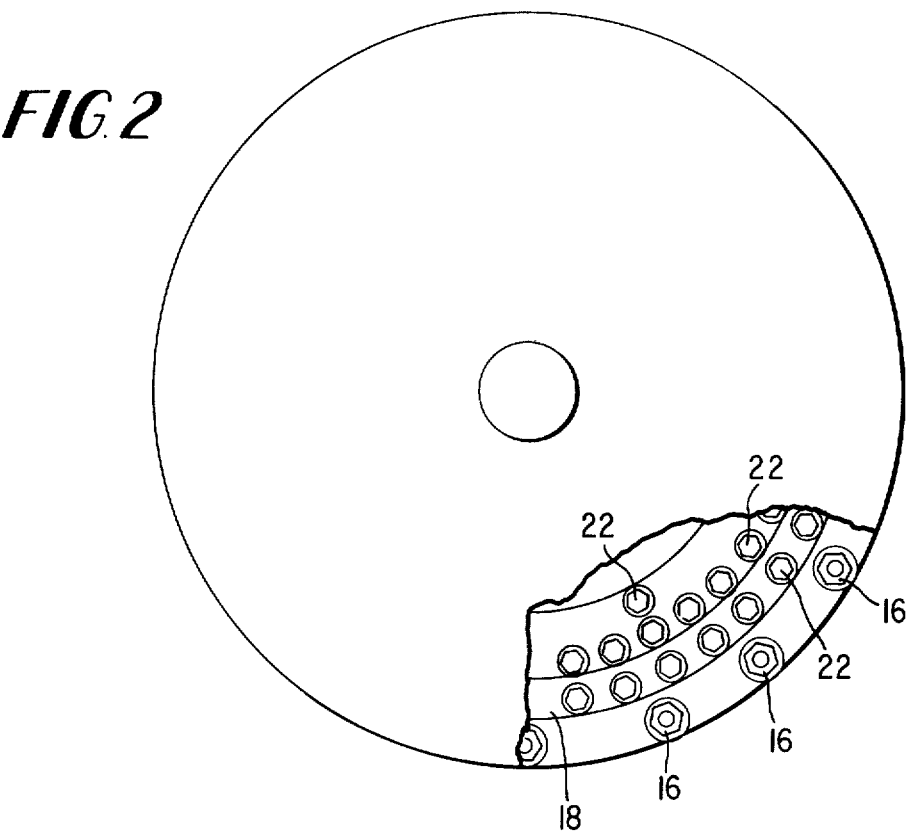
FIG. 2 is an end view of a portion of a dynamoelectric machine, partly broken away to further illustrate the flux shield mounting arrangement of this invention.

Referring to FIGS. 1 and 2, there is shown a dynamoelectric machine including a stator 10 formed in a conventional manner from a plurality of punchings or laminations. The laminations forming the stator 10 are held in assembled relationship by end flanges, one of which is shown at 12. While in the drawing only the single end flange at one end of the stator is illustrated, it will be apparent that, as in the usual construction of dynamoelectric machines, an end flange is positioned at each end of the stator. For effecting assembly of the stator there are provided a plurality of bolts or keybars 14 which are keyed to dovetailed apertures in the laminations of the stator and through openings in the end flanges. At each end of the keybars a nut 16 is provided in threaded engagement therewith for urging the end flanges against the ends of the stator to complete the stator assembly.

In the normal operation of dynamoelectric machines, leakage flux between the rotor and stator intersects the end flanges, inducing currents therein. This results in current in the stator laminations and undesirable heating thereof. Such heating can result in serious damage to the stator. Flux shields of non-magnetic material, such as copper, have been provided exteriorly of the end flanges to reduce the current induced in the end flanges through such leakage flux. These flux shields, however, have been mounted in direct electrical contact with the end flanges so that currents induced in the flux shields themselves by the leakage flux have in turn passed to the end flanges and undesirable heating of the stator core may occur. By this invention the flux shield is so mounted with respect to the end flange as to be electrically insulated therefrom.

As shown in FIGS. 1 and 2 an annular flux shield 18 is provided in spaced relation to the end flange and is shaped to generally conform to the cross sectional shape of the end flange. The flux shield is made of a highly conductive non-magnetic material, such as copper. It may be made in a single piece but for convenience of manufacture it is shown in FIG. 1 as being formed of two pieces of L-shaped cross section joined by brazing or in any other suitable manner at 20.

In accordance with this invention, the flux shield 18 is mounted on the end flange in such a manner that it is electrically insulated therefrom and any currents induced in the flux shield are therefore not transferred to the end flange. For this purpose a plurality of bolts 22 are provided in spaced relationship along the face of the flux shield. Each of the bolts extends through an aperture in the flux shield and is received in a recess in the end flange.

Figure 3:
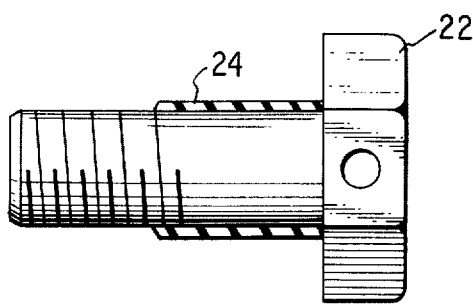
FIG. 3 is a view of one of the bolts employed in mounting the flux shield.

As shown in FIG. 3 each bolt 22 is provided with an insulating sleeve 24. This sleeve covers the portion of the shank of the bolt 22 which extends through the aperture in the flux shield 18 and thereby insulates the bolt from the flux shield in the region of the aperture.

Between the head of the bolt 22 and the flux shield there are provided a washer 26 of electrical insulating material and a metal spacer 28. The washer 26 provides insulation between the bolt head and the flux shield and is relatively thin to minimize distortion. The metal spacer 28 is provided between the head and the insulating washer 26 to provide an even pressure on the surface of the insulating washer and to prevent damage to the washer from the bolt head as the assembly is completed. Positioned on the shank of each bolt 22 between the flux shield and the end flange are a washer 30 of electrical insulating material and a metal spacer 32. The insulating washer prevents electrical contact between the flux shield and the end flange and the spacer insures sufficient space for circulation of cooling gas between the flux shield and the end flange.

It can be seen that by the above-described structure the flux shield is mounted in a position to intercept any leakage flux between the rotor and stator and to prevent this flux from reaching the end flange and inducing potentially damaging currents therein and in the stator core. The mounting arrangement described further insures that the flux shield is electrically insulated from the end flange so that currents induced in the flux shield are not transmitted to the end flange and the stator core to cause heating and damage thereto.

Figure 4:
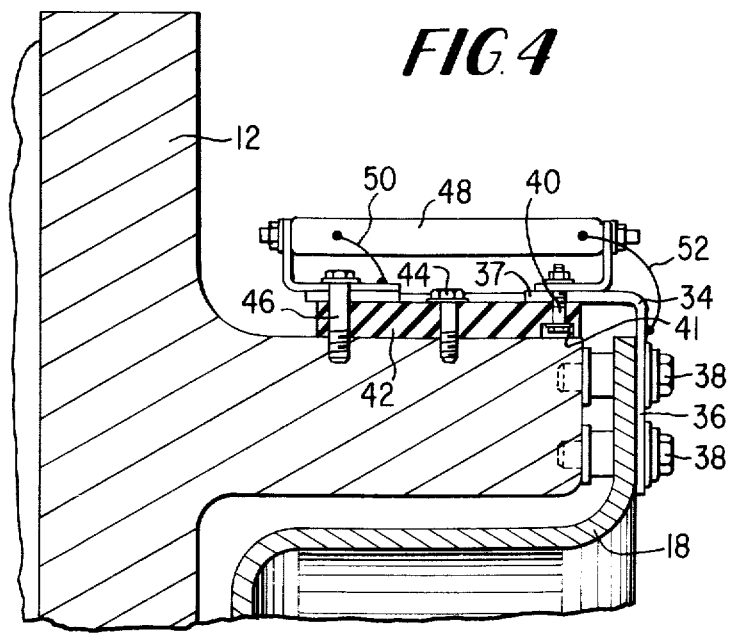
FIG. 4 is a view of a portion of the end flange and flux shield structure illustrating the resistance connection between the flux shield and the end flange.

In order to insure that the flux shield is maintained at substantially ground potential a single grounding arrangement is provided between the flux shield and the end flange. This grounding arrangement is shown in detail in FIG. 4. It includes an L-shaped conducting member 34, one leg 36 of which is mounted on the flux shield in electrical contact therewith by means of two bolts 38 which extend through the member 34 and the flux shield and engage the end flange 12. The bolts 38 and the washers and spacer associated therewith correspond to bolts 22 and associated washers and spacer previously described, so that no electrical conductivity is provided between the flux shield and the end flange through the bolts 38. The other leg 37 of the member 34 is mounted by a bolt 40 on an insulating block 42, the head of the bolt 40 being received in a recess 41 in the insulating block 42. The insulating block 42 is mounted on the end flange by bolts 44 and 46 which extend through the insulating block and engage the end flange. To provide a resistance path between the flux shield and the end flange for maintaining the flux shield at substantially ground potential a resistor 48 of approximately 5 ohms is mounted on the insulating block 42, the bolts 40 and 46 being employed for this purpose. One terminal of the resistor 48 is connected by a lead 50 through the bolt 46 in electrical conducting relationship with the end flange. The other terminal of the resistor is connected by a lead 52 to the member 34 which is in electrical conducting relationship with the flux shield 18. The only electrical conductivity path provided between the flux shield and the end flange is through the aforementioned resistor 48. The resistor limits any circulating current which may occur, if the flux shield is accidentally grounded at a second location.

While there has been shown and described a specific embodiment of the flux shield arrangement of this invention, it will be apparent to those skilled in the art that modifications may be made without departing from the substance of this invention, and it is intended by the appended claims to cover such modifications as come within the spirit and scope of this invention.

We claim:

1. In a dynamoelectric machine of the type including a stator core comprising a plurality of laminations held in assembled relation by a number of circumferentially spaced, axially extending keybars secured at each opposite end to a respective end flange; an improved flux shield assembly at each end of the dynamoelectric machine, wherein the improvement comprises:
   a. a non-magnetic, annular flux shield of high electrical conductivity spaced from but adjacent to a respective end flange on a side further removed from the stator core;
   b. fastening means securing each flux shield to its respective end flange; and,
   c. means in combination with said fastening means for electrically insulating each flux shield from its respective end flange.

2. In a dynamoelectric machine of the type including a stator core comprising a plurality of laminations held in assembled relation by a number of circumferentially spaced, axially extending keybars secured at each opposite end to a respective end flange; an improved flux shield assembly at each end of the dynamoelectric machine, wherein the improvement comprises:
   a. a non-magnetic, annular flux shield of high electrical conductivity spaced from but adjacent to a respective end flange on a side further removed from the stator core;
   b. fastening means securing each flux shield to its respective end flange;
   c. means in combination with said fastening means for electrically insulating each flux shield from its respective end flange; and,
   d. means for electrically connecting each flux shield to its respective end flange through a single ground connection between said end flange and said flux shield, said ground connection including a resistor.

3. The improvement as defined in claim 1 wherein said fastening means comprises a plurality of bolts extending through each flux shield and engaging its respective end flange and wherein said means for electrically insulating each respective flux shield comprises an electrically insulating sleeve on each of said bolts and further comprises washers of electrically insulating material interposed between each flux shield and its respective end flange and between each flux shield and the head of each of said bolts.

4. The improvement of claim 1 further including means for electrically connecting said flux shield to said end flange at one point to provide a ground connection between said end flange and said flux shield, said ground connection including a resistor.

5. The improvement of claim 4 wherein said means for electrically connecting said flux shield to said end flange to provide a ground connection includes:
   a. means for mounting said resistor on said end flange,
   b. a member of electrically conducting material mounted on said flux shield, and
   c. one terminal of said resistor being connected in electrically conducting relationship with said end flange and the other terminal of said resistor being electrically connected to said member.

* * * * *